J. King,
Horse Rake.

No 55,672. Patented June 19, 1866.

Inventor:
Jacob King
Per Munn & Co
Attorneys

Witnesses:

UNITED STATES PATENT OFFICE.

JACOB KING, OF OMAHA, NEBRASKA.

IMPROVEMENT IN HORSE-RAKES.

Specification forming part of Letters Patent No. 55,672, dated June 19, 1866.

*To all whom it may concern:*

Be it known that I, JACOB KING, of Omaha, in the county of Douglas and State of Nebraska, have invented a new and useful Improvement in Horse Hay-Rake; and I do hereby declare that the following is a full, clear, and exact description thereof, which will enable others skilled in the art to make and use the same, reference being had to the accompanying drawings, forming a part of this specification, in which—

Figure 1:
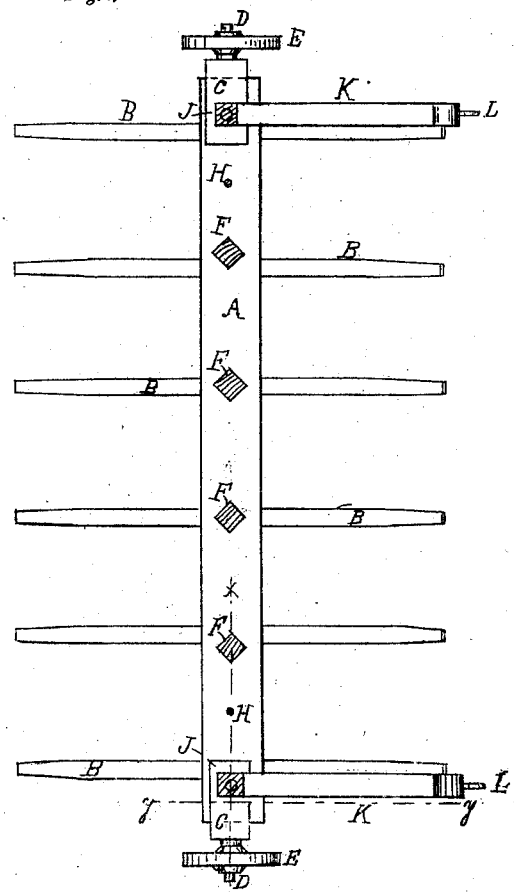
Figure 2:
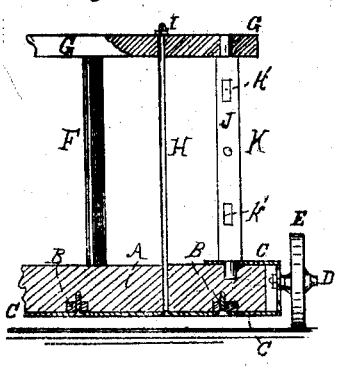
Figure 3:
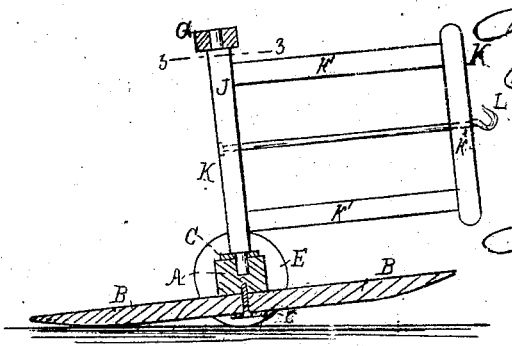

Figure 1 is a top view of my improved rake, the top rail of the upright frame being cut off through the line $z\,z$, Fig. 3. Fig. 2 is a detail sectional view taken through the line $x\,x$, Fig. 1. Fig. 3 is a detail sectional view taken through the line $y\,y$, Fig. 1.

Similar letters of reference indicate like parts.

My invention has for its object to furnish a horse hay-rake by means of which the hay may be taken from any part of the meadow and collected at any given point without the necessity of a wagon or cart; and it consists of a hay-rake constructed as hereinafter more fully described.

A is the bar, in which the teeth B are set. The teeth B are let into the lower sides of the bar A, as shown in Fig. 3, where they are secured in place by a band, C, passing along the under side of the bar A and overlapping the ends of the said bar A, as shown in Figs. 1 and 2; and the teeth B and band C are secured to the bar A by screws D passing through the band and teeth into the bar A, as shown in Figs. 2 and 3. The band C, where it passes over the ends of the bar A, projects a little beyond said bar, and to this projecting part are attached the ends of the axles D, upon which the wheels E are placed. These wheels E are of such a size as will raise the bar A slightly above the ground, so that the rake may travel easily over the ground.

F are the uprights of the vertical frame of the rake. These uprights are mortised into the bar A and the top rail, G, and the frame is strengthened and held together by the rods H and nuts I. This frame is designed to hold the hay upon the rake while being transported to the desired point.

The end uprights, J, are made to revolve in the bar A and rail G, as shown in Figs. 2 and 3. Into these uprights J are framed the bars $k'$ of the swinging frames K, and the said bars $k'$ are connected at their outer ends by the bars $k^2$, as shown in Fig. 3.

L are the draft-hooks, which pass through the frame K, and are secured thereto, as shown in the drawings. To these hooks the horses are attached, one at each end of the rake.

When the hay has been collected and drawn by the rake to the stack or other desired point, the horses are turned around and the rake drawn from beneath the hay.

By means of this rake the hay can be very quickly collected into one spot without its being necessary to use a wagon or cart, thus saving much time in collecting the hay.

I claim as new and desire to secure by Letters Patent—

The rake provided with sets of teeth on each side of the head, and drawn by means of the reversible swinging-frames K, constructed and operating substantially as described and represented.

JACOB KING.

Witnesses:
 JOHN H. SAHLER,
 ISAAC I. HASCOLL.